J. McPherson,
Horseshoe.

N° 51,738.    Patented Dec. 26, 1865.

Witnesses;
J. J. Peyton.
Theodore Lang.

Inventor;
James McPherson

UNITED STATES PATENT OFFICE.

JAMES McPHERSON, OF ROCKFORD, ILLINOIS.

IMPROVEMENT IN HORSESHOES.

Specification forming part of Letters Patent No. 51,738, dated December 26, 1865.

*To all whom it may concern:*

Be it known that I, JAMES MCPHERSON, of Rockford, in the county of Winnebago and State of Illinois, have invented a new and useful Improvement in Horseshoes; and I do hereby declare that the following is a full, clear, and exact description of the construction and operation of the same, reference being had to the annexed drawings, making a part of this specification, in which—

Figure 1:
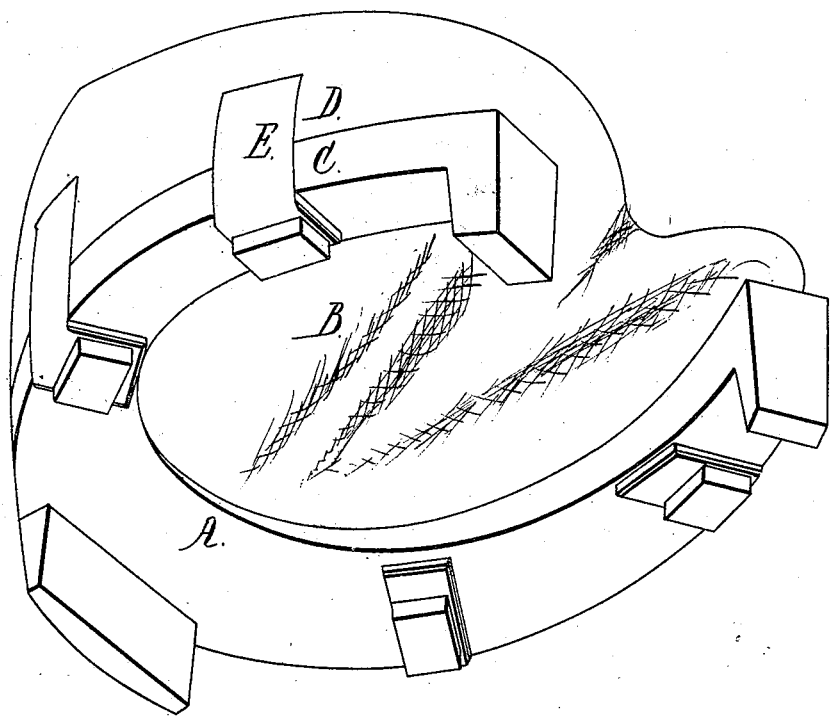
Figures 2, 3, 4:
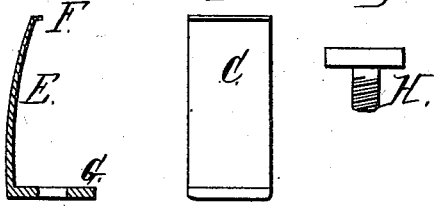

Figure 1 is a perspective view of my invention applied to the hoof. Fig. 2 is a view of the inside of my improved steel spring-clasp. Fig. 3 is an edge view thereof, and Fig. 4 is a sectional view of the screw by which the spring-clasp is held to the shoe.

In the efforts hitherto made to fasten on horseshoes without nailing to the hoof, rigid clips or clamps have alone been used, and these from the growth of the hoof require frequent adjustment, and from the contraction of the hoof repeated removals, and, besides, are often mischievous when applied to diseased hoofs; and it is the object of my invention to remedy these defects; and to this end my invention consists in attaching the shoe to the hoof by steel spring-clasps that shall yield to the growing hoof, shrink upon the contracting hoof, and accommodate the pressure of the shoe to the diseased hoof, so as to afford the best facilities for its restoration to a sound condition.

I form the shoe A exactly to fit the trimmed hoof B, leaving depressions C in the shoe to receive the spring-clasps, so that when applied they shall be nearly level with the edge of the shoe. Then I form a recess, D, in the hoof to receive the upper portion of the steel spring-clasp E, the recess being deepest at the top to receive the clinch F of the clasp. The clasp E is made of spring-steel, and tapers in thickness from the base G to the clinch F, where it is thinnest, and the clinch is made sufficiently strong to retain constantly a firm hold upon the outer wall of the hoof. The spring-clasp E is bent in a curve of less radius than the trimmed recess in the hoof, and the depression in the shoe and its base is punched or drilled to receive the screw H, which fastens it permanently in place.

It is obvious that the width of the spring-clasp may be varied to suit the condition of the hoof or the work required, and also that the screw-heads may be countersunk so as to be light for summer or for racing shoes; that they may terminate in square heads or pointed corks for hard, heavy work over slippery surfaces.

When the shoe is thus formed and the hoof thus prepared to receive it the shoe is properly applied, and the clinches of the clasps one after the other are placed in their respective recesses formed in the hoof, and the insides of the base are pressed firmly down upon the shoe until the hole in the base is in position to receive the screw, which then may be driven to hold the shoe in place. Now, as the spring-clasp is forced forward into place it is manifest that it will hold with an elastic pressure which will yield as the hoof shall grow and bind as the hoof may shrink, and, further, that while it will hold the shoe securely it will not contract the heels of the horse or offer any obstruction to the healing of a diseased hoof that could arise from the cramping of the shoe.

What I claim as my invention, and desire to secure by Letters Patent, is—

The combination of the steel spring-clasp with the shoe, when constructed, arranged, and operating substantially in the manner and for the purpose described.

In testimony whereof I have hereunto subscribed my name.

JAMES McPHERSON.

Witnesses:
EDM. F. BROWN,
JOS. I. PEYTON.